(12) United States Patent
Vibert

(10) Patent No.: US 6,397,396 B1
(45) Date of Patent: Jun. 4, 2002

(54) BALL CAP WITH ATTACHED SUNGLASSES

(76) Inventor: John Vibert, 7450 Palm La., Fontana, CA (US) 92336

( * ) Notice: Subject to any disclaimer, the term of this patent is extended or adjusted under 35 U.S.C. 154(b) by 0 days.

(21) Appl. No.: 09/871,845

(22) Filed: Jun. 1, 2001

(51) Int. Cl.[7] ................................................. A42B 1/24
(52) U.S. Cl. ..................................... 2/209.13; 2/209.12
(58) Field of Search ............................. 2/175.1, 209.13, 2/209.12, 195.1, 195.7

(56) References Cited

U.S. PATENT DOCUMENTS

| 4,179,753 | A | * | 12/1979 | Aronberg et al. ................ 2/10 |
| 5,687,420 | A | * | 11/1997 | Chong ............................... 2/10 |
| 5,860,167 | A | * | 1/1999 | Lizio .......................... 2/209.13 |
| 6,137,447 | A1 | * | 1/2001 | Arnold ............................. 2/10 |
| 6,237,159 | B1 | * | 5/2001 | Martin ....................... 2/290.12 |

* cited by examiner

*Primary Examiner*—Bibhu Mohanty
(74) *Attorney, Agent, or Firm*—Goldstein Law Offices, P.C.

(57) ABSTRACT

A ball cap with attached sunglasses including a cap portion comprised of a head portion and a brim portion. The head portion has an open lower end for being positioned atop a head. The brim portion extends laterally from the open lower end of the head portion. A pair of sunglasses are adapted for being pivotally and rotatably coupled with the cap portion.

1 Claim, 4 Drawing Sheets

BALL CAP WITH ATTACHED SUNGLASSES

BACKGROUND OF THE INVENTION

The present invention relates to a ball cap with attached sunglasses and more particularly pertains to allowing sunglasses to be securely held in place while wearing.

The use of combination head wear devices is known in the prior art. More specifically, combination head wear devices heretofore devised and utilized for the purpose of combining head wear with various accessory items are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,898,935 to Davis discloses a cap with an interchangeable visor and protective eyewear attached to a swivel mechanism. U.S. Pat. No. 5,291,880 to Almovist discloses a protective helmet with a facepiece capable of rotating to a position on top of the helmet. U.S. Pat. No. 5,548,841 to Sherlock discloses a headband with a rotatably attached magnifier.

While these devices fulfill their respective, particular objective and requirements, the aforementioned patents do not describe a ball cap with attached sunglasses for allowing sunglasses to be securely held in place while wearing.

In this respect, the ball cap with attached sunglasses according to the present invention substantially departs from the conventional concepts and designs of the prior art, and in doing so provides an apparatus primarily developed for the purpose of allowing sunglasses to be securely held in place while wearing.

Therefore, it can be appreciated that there exists a continuing need for a new and improved ball cap with attached sunglasses which can be used for allowing sunglasses to be securely held in place while wearing. In this regard, the present invention substantially fulfills this need.

SUMMARY OF THE INVENTION

In the view of the foregoing disadvantages inherent in the known types of combination head wear devices now present in the prior art, the present invention provides an improved ball cap with attached sunglasses. As such, the general purpose of the present invention, which will be described subsequently in greater detail, is to provide a new and improved ball cap with attached sunglasses which has all the advantages of the prior art and none of the disadvantages.

To attain this, the present invention essentially comprises a cap portion comprised of a head portion and a brim portion. The head portion has an open lower end for being positioned atop a head. The brim portion extends laterally from the open lower end of the head portion. The cap portion has a pair of coupling strips secured thereto on opposing sides thereof. Each of the coupling strips has a plurality of linearly aligned apertures therein in a spaced relationship. A pair of sunglasses are adapted for being pivotally and removably coupled with the cap portion. The pair of sunglasses include a pair of lenses having a nose piece disposed therebetween. The pair of lenses each have a side arm extending rearwardly therefrom. The side arm has an inner section and an outer section. The inner section has an inner end and an outer end. The inner end is hingedly coupled with the lens. The outer section has an inner end and an outer end. The inner end of the outer section is removably and rotatably coupled with the outer end of the inner section. The outer end of the outer section has a protrusion extending laterally therefrom. The protrusion is capable of being snap engaged with one of the apertures of the coupling strip of the head portion of the cap portion.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved ball cap with attached sunglasses which has all the advantages of the prior art combination head wear devices and none of the disadvantages.

It is another object of the present invention to provide a new and improved ball cap with attached sunglasses which may be easily and efficiently manufactured and marketed.

It is a further object of the present invention to provide a new and improved ball cap with attached sunglasses which is of durable and reliable construction.

An even further object of the present invention is to provide a new and improved ball cap with attached sunglasses which is susceptible of a low cost of manufacture with regard to both materials and labor, and which accordingly is then susceptible of low prices of sale to the consuming public, thereby making such a ball cap with attached sunglasses economically available to the buying public.

Even still another object of the present invention is to provide a new and improved ball cap with attached sunglasses for allowing sunglasses to be securely held in place while wearing.

Lastly, it is an object of the present invention to provide a new and improved ball cap with attached sunglasses including a cap portion comprised of a head portion and a brim portion. The head portion has an open lower end for being positioned atop a head. The brim portion extends laterally from the open lower end of the head portion. A pair of sunglasses are adapted for being pivotally and removably coupled with the cap portion.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
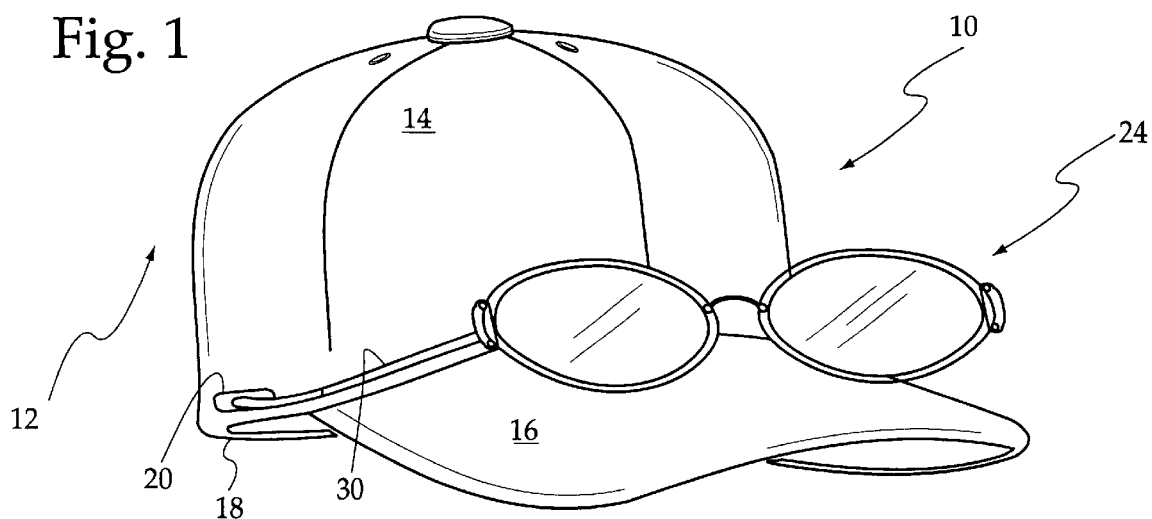
FIG. 1 is a perspective view of the preferred embodiment of the ball cap with attached sunglasses constructed in accordance with the principles of the present invention.

With reference now to the drawings, and in particular, to figures one through eight thereof, the preferred embodiment of the new and improved ball cap with attached sunglasses embodying the principles and concepts of the present invention and generally designated by the reference number 10 will be described.

Specifically, it will be noted in the various figures that the device relates to a ball cap with attached sunglasses for allowing sunglasses to be securely held in place while wearing. In its broadest context, the device consists of a cap portion and a pair of sunglasses. Such components are individually configured and correlated with respect to each other so as to attain the desired objective.

The cap portion 12 is comprised of a head portion 14 and a brim portion 16. The head portion 14 has an open lower end 18 for being positioned atop a head. The brim portion 16 extends laterally from the open lower end 18 of the head portion 14. The cap portion 12 has a pair of coupling strips 20 secured thereto on opposing sides thereof. Each of the coupling strips 20 has a plurality of linearly aligned apertures 22 therein in a spaced relationship.

The pair of sunglasses 24 are adapted for being pivotally and removably coupled with the cap portion 12. The pair of sunglasses 24 include a pair of lenses 26 having a nose piece 28 disposed therebetween. The pair of lenses 26 each have a side arm 30 extending rearwardly therefrom. The side arm 30 has an inner section 32 and an outer section 34. The inner section 32 has an inner end 36 and an outer end 38. The inner end 36 is hingedly coupled with the lens 26. The outer section 34 has an inner end 40 and an outer end 42. The inner end 40 of the outer section 34 is removably and rotatably coupled with the outer end 38 of the inner section 32. The outer end 42 of the outer section 34 has a protrusion 42 extending laterally therefrom. The protrusion 42 is capable of being snap engaged with one of the apertures 22 of the coupling strip 20 of the head portion 14 of the cap portion 12.

FIG. 1 illustrates the sunglasses 24 positioned atop the brim portion 16 with the outer ends 42 secured to the coupling strips 20.

Figure 2:
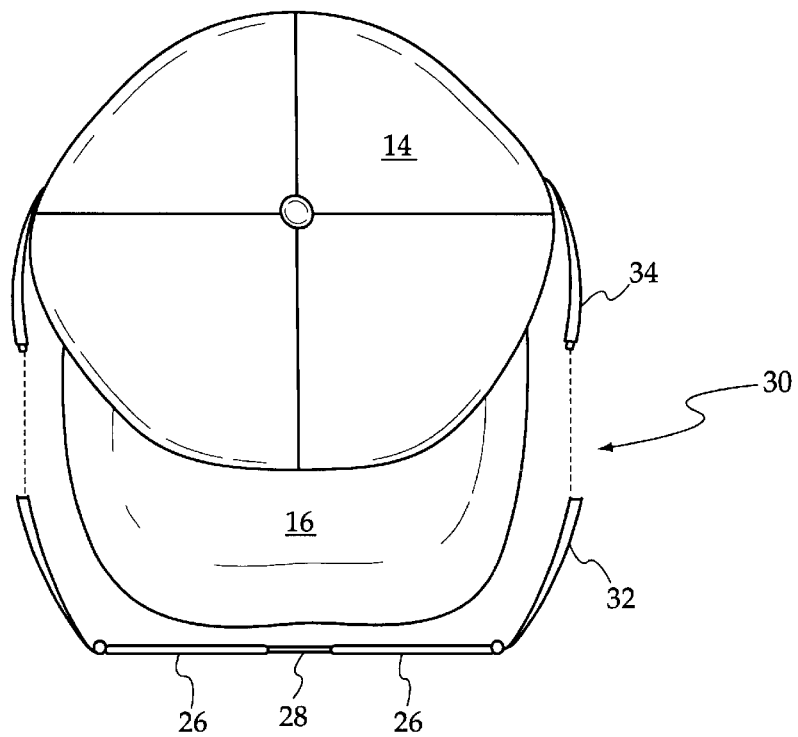
FIG. 2 is a top plan view of the present invention.

FIG. 2 shows how the sunglasses 24 can be separated whereby the inner and outer sections 32,34 can be separated from one another. In this orientation, the sunglasses 24 can be positioned on the face of the wearer and the inner and outer sections 32,34 reconnected.

Figure 3:
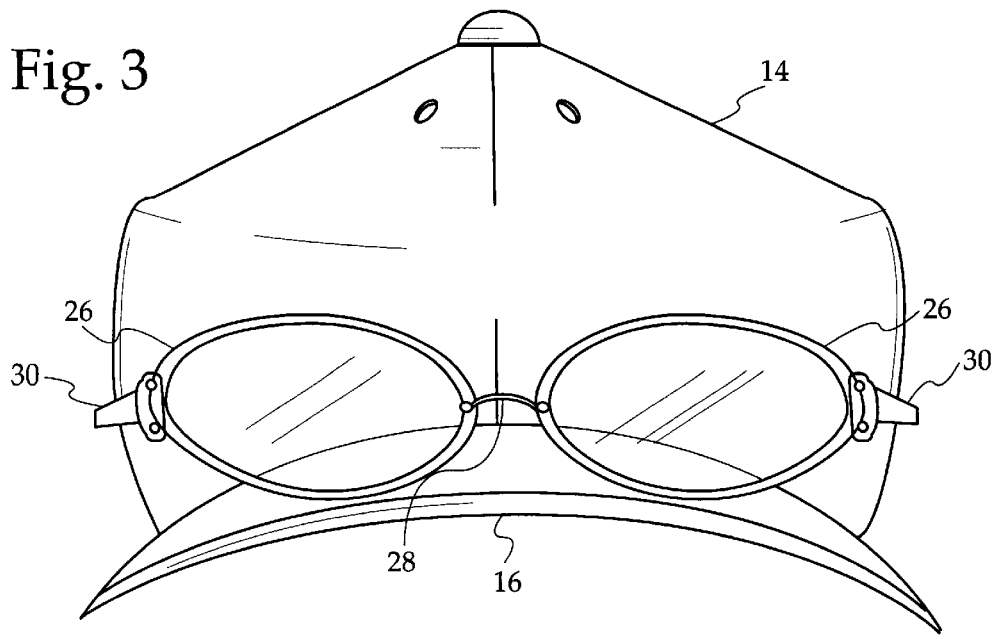
FIG. 3 is an elevated front view of the present invention.

FIG. 3 shows the sunglasses 24 positioned atop the brim portion 16 with the outer ends 42 secured to the coupling strips 20 in a manner similar to that shown in FIG. 1.

Figure 4:
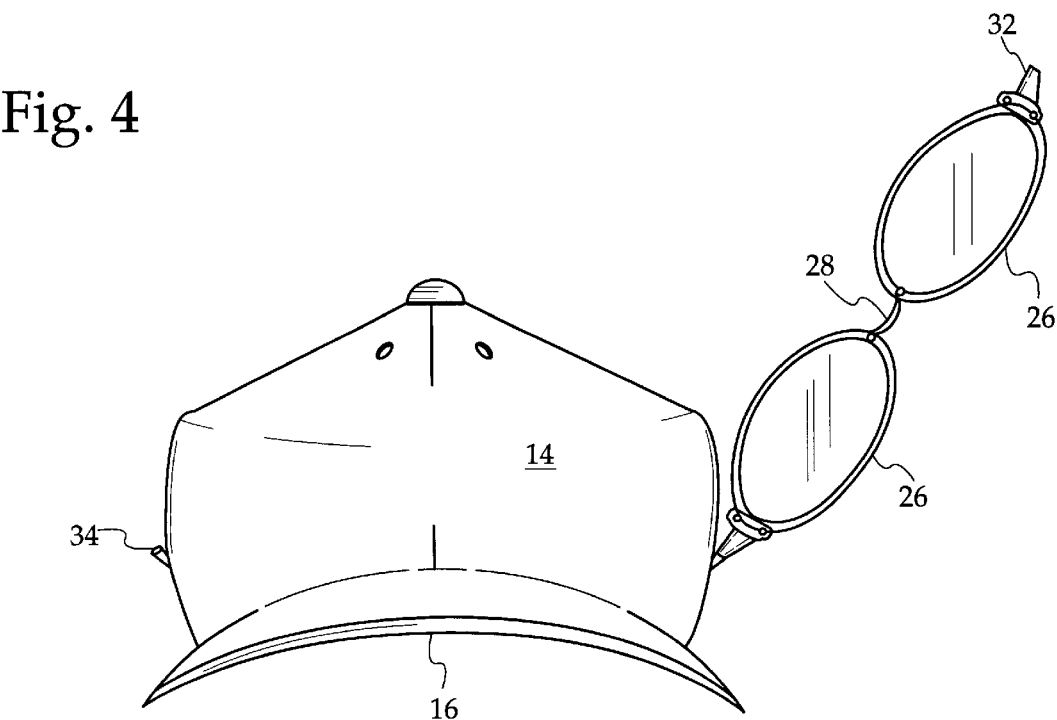
FIG. 4 is an elevated front view of the present invention illustrated with the sunglasses in a pivoted orientation.

FIG. 4 shows the pivoting of the sunglasses 24 with respect to the cap portion 12. In this orientation, one of the side arms 30 is separated whereupon the sunglasses 24 can be rotated to a position on the user's face where after the detached side arm 30 can be reconnected.

Figure 5:
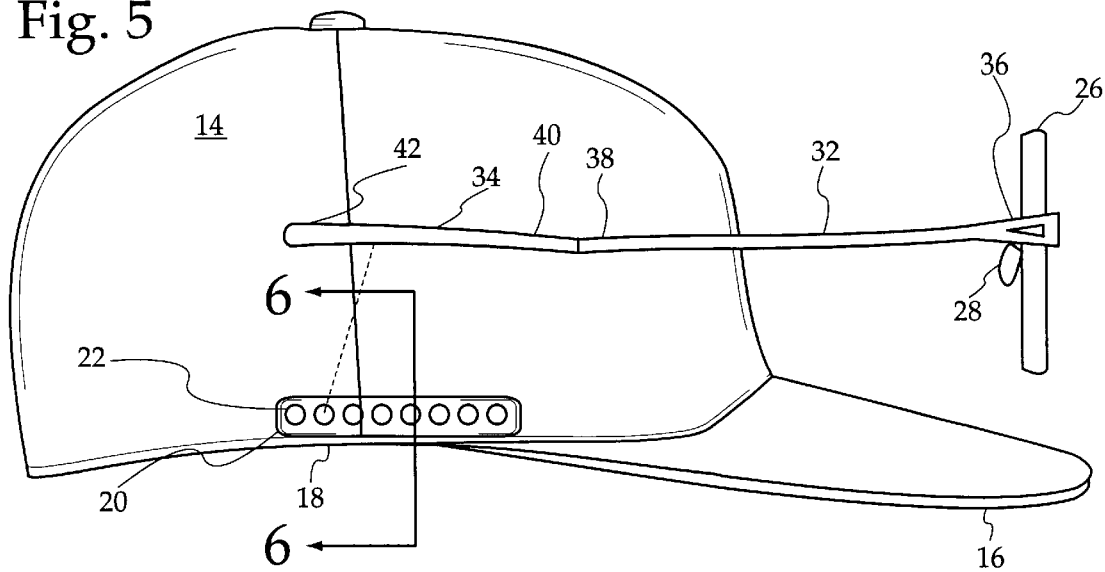
FIG. 5 is a side elevation view of the present invention.
Figure 6:
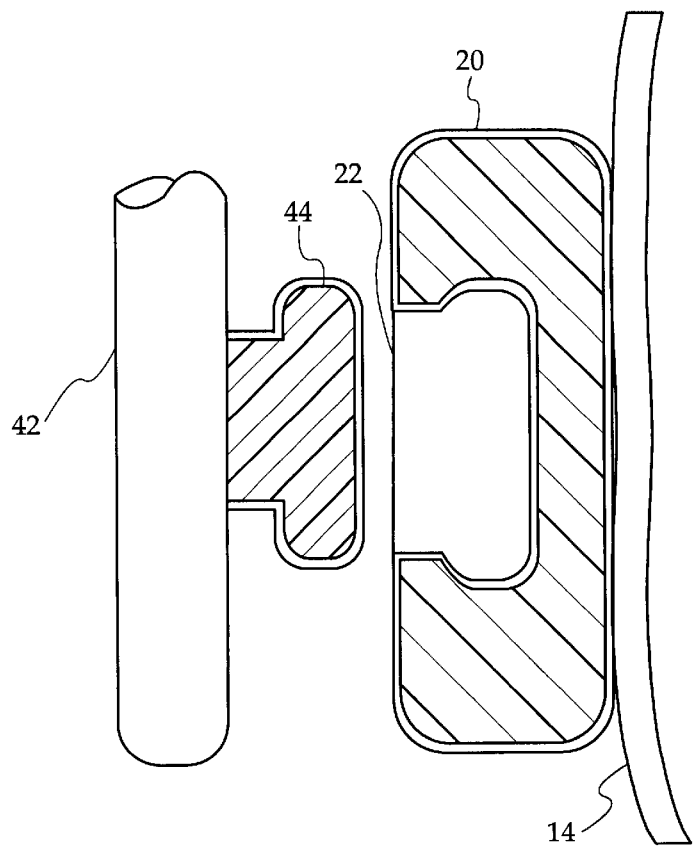
FIG. 6 is a cross-sectional view of the present invention as taken along line 6—6 of FIG. 5.

FIGS. 5 and 6 illustrate the connection of the sunglasses 24 to the cap portion 12 via the coupling strips 20 and aperture's 22 thereof with the protrusion 44 of the sunglasses 24. The protrusion 44 can be easily attached to, and removed from one of the apertures 22 to facilitate the coupling.

Figure 7:
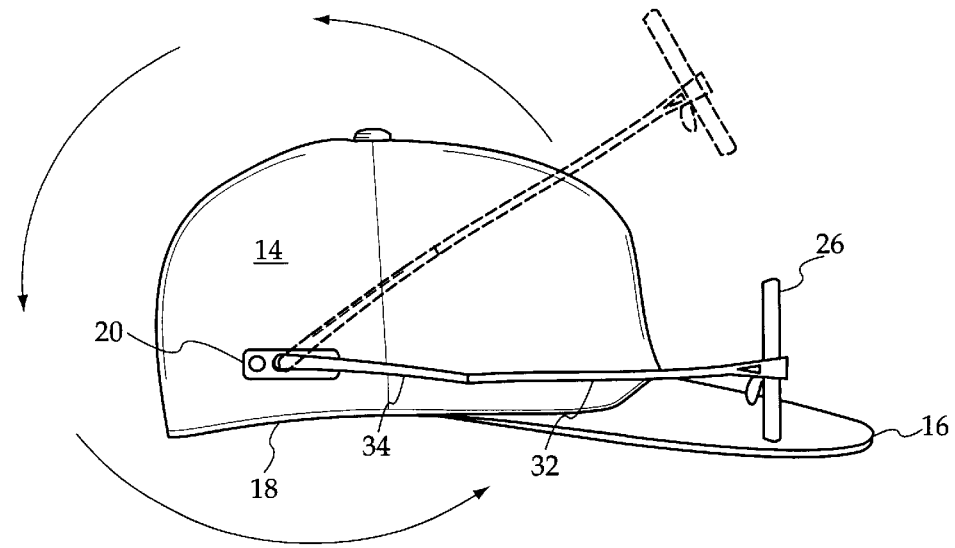
FIG. 7 is a side elevation view of the present invention illustrated with the sunglasses in a raised orientation.

FIG. 7 shows how the sunglasses 24 can be pivoted with respect to the cap portion 12.

Figure 8:
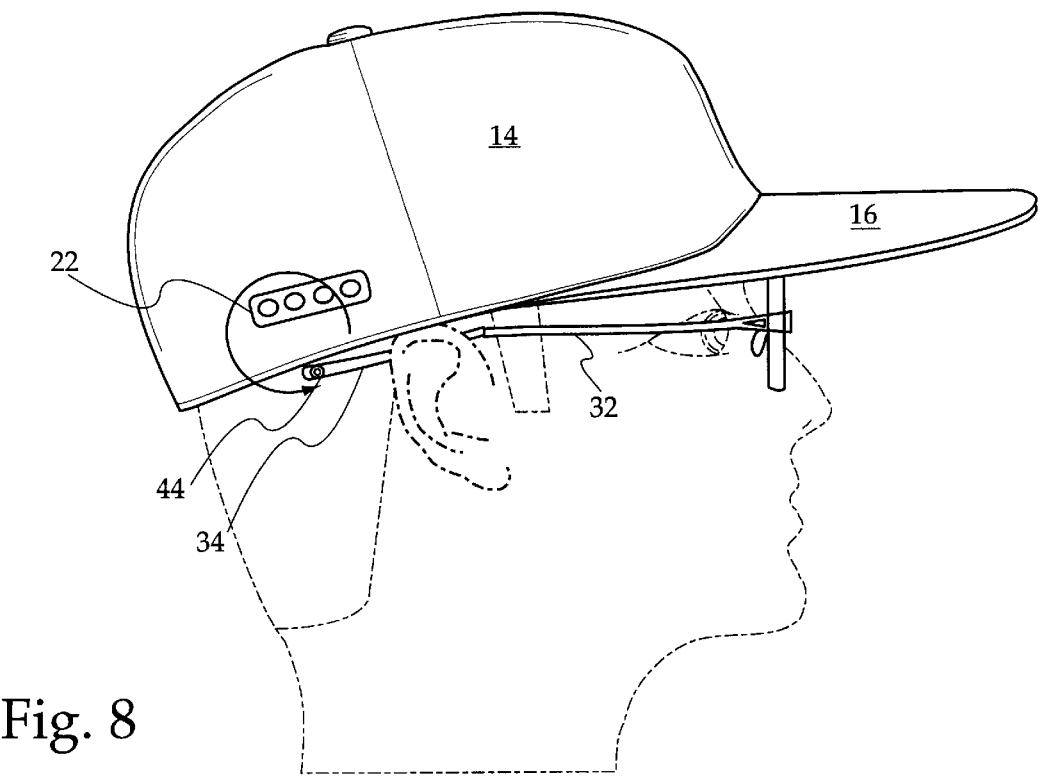
FIG. 8 is a side view of the present invention illustrated with the sunglasses in a detached orientation and the ear piece rotated outwardly.

FIG. 8 illustrates the rotatability of the outer section 34 with respect to the inner section 32 whereby the protrusion 44 can be positioned away from the user's head while the sunglasses 24 are being worn.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letter Patent of the United States is as follows:

1. A ball cap with attached sunglasses for allowing sunglasses to be securely held in place while wearing comprising, in combination:

a cap portion comprised of a head portion and a brim portion, the head portion having an open lower end for being positioned atop a head, the brim portion extending laterally from the open lower end of the head portion, the cap portion having a pair of coupling strips secured thereto on opposing sides thereof, each of the coupling strips having a plurality of linearly aligned apertures therein in a spaced relationship; and a pair of sunglasses adapted for being pivotally and removably coupled with the cap portion, the pair of sunglasses including a pair of lenses having a nose piece disposed therebetween, the pair of lenses each having a side arm extending rearwardly therefrom, the side arm having an inner section and an outer section, the inner section having an inner end and an outer end, the inner end being hingedly coupled with the lens, the outer section having an inner end and an outer end, the inner end of the outer section being removably and rotatably coupled with the outer end of the inner section, the outer end of the outer section having a protrusion extending laterally therefrom, the protrusion being capable of being snap engaged with one of the apertures of the coupling strip of the head portion of the cap portion.

* * * * *